(12) United States Patent
Witte et al.

(10) Patent No.: US 6,502,654 B2
(45) Date of Patent: Jan. 7, 2003

(54) UTILITY TRANSPORT TRACTOR

(75) Inventors: Benjamin Michael Witte, Fairbank, IA (US); Robert James Recker, Waterloo, IA (US); Barrie Lloyd Smith, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/861,390

(22) Filed: May 18, 2001

(65) Prior Publication Data

US 2002/0170760 A1 Nov. 21, 2002

(51) Int. Cl.[7] ..................... B62D 33/027; B62D 25/24; B60R 27/00
(52) U.S. Cl. ..................... 180/89.1; 296/183; 296/51
(58) Field of Search ..................... 180/89.1; 296/183, 296/51, 37.3

(56) References Cited

U.S. PATENT DOCUMENTS

| | | | | | |
|---|---|---|---|---|---|
| 1,952,883 A | * | 3/1934 | Nelson | ..................... | 296/51 |
| 2,136,010 A | * | 11/1938 | Housdorfer | ..................... | 296/51 |
| 2,345,351 A | * | 3/1944 | Maxon et al. | ..................... | 180/53.1 |
| 2,806,736 A | * | 9/1957 | Selzer | ..................... | 296/51 |
| 3,023,451 A | * | 3/1962 | Thoel | ..................... | 16/258 |
| 3,749,440 A | * | 7/1973 | Lathers | ..................... | 296/51 |
| 4,541,570 A | * | 9/1985 | Rieke et al. | ..................... | 239/676 |
| 4,613,183 A | * | 9/1986 | Kesling | ..................... | 296/183 |
| D305,627 S | | 1/1990 | Takagi et al. | ..................... | D12/98 |
| D332,239 S | | 1/1993 | Hirata et al. | ..................... | D12/1 |
| 5,480,208 A | * | 12/1996 | Miller, Sr. | ..................... | 414/703 |
| 5,647,441 A | | 7/1997 | Gibbons | ..................... | 172/439 |
| 5,975,216 A | | 11/1999 | Gibbons | ..................... | 172/439 |
| 5,997,067 A | * | 12/1999 | Shambeau et al. | ..................... | 296/57.1 |

OTHER PUBLICATIONS

Tructor® T–4000 Work Vehicles, Multi–Purpose Tractor–Truck, 1 Sheet Brochure. Date Unknown.
Turf & E–Gator® Utility Vehicles Brochure by John Deere. Jan. 2000.
Intrac System 2000 Brochure by Deutz Fahr. Before Jul. 1972.
Mercedes–Benz Unimog Brochure. Date Unknown.
Mercedes–Benz Unimog Brochure. Before Jul. 1972.
MB Trac 65/70 Brochure. Before Dec. 1973.
Fendt Kommunal–System 255/275 GT Brochure. Before Sep. 1981.
Kawasaki Three Mules Are Better Than One Brochure. 1989.
Cushman ® Turf Care Brochure. Nov. 1996.
Toro® Workman ™ 3000 Series Brochure. 1992.
Kawasaki Mule ™ 500 Brochure. 1993.
Yamaha Pro4 Utility Products Brochure. 1989.
Haul Master HM4016 Brochure. Date Unknown.
Polaris, Where The Roads Ends, The Stories Begin Brochure. 1989.

* cited by examiner

Primary Examiner—Paul N. Dickson
Assistant Examiner—Laura B. Ross

(57) ABSTRACT

A utility transport tractor having a cargo box above the rear axle with the operator's platform forward of the rear axle enabling additional seats to be included. To maintain the functionality of a conventional agricultural tractor, the cargo box tail gate and a portion of the cargo box floor can be raised to positions in which they both extend upwardly and forwardly toward the operator. In these positions, the three point hitch at the rear of the tractor is visible to the operator as is typically the case conventional agricultural tractors. The tail gate is mounted to the cargo box for rotation about multiple axes to pivot the tail gate to multiple open positions.

22 Claims, 3 Drawing Sheets

UTILITY TRANSPORT TRACTOR

BACKGROUND OF THE INVENTION

1. Field of the Invention

The present invention relates to a utility transport tractor that combines with an agricultural tractor the capability to transport materials while still maintaining the common features of an agricultural tractor, such as a three point hitch.

2. Description of Related Art

Agricultural tractors are designed primarily to supply power to agricultural implements and to produce a continuous draft force in the direction of travel to enable soil engaging implements to perform their intended functions. Agricultural tractors must be designed with sufficient downward force acting on the drive wheels to produce the desired draft force. Often this results in a vehicle having drive wheels that are larger than the non-drive wheels to accommodate the large downward force on the drive wheels. Agricultural tractors differ from cargo carrying vehicles such as trucks in that trucks do not need to produce a continuous draft load. A truck only needs to produce a draft load when pulling a load during periods of acceleration and deceleration.

An agricultural tractor, designed primarily to produce a draft load, has limited, if any, ability to carry cargo. A farmer must use a truck or a wagon hitched to a tractor to haul cargo. Other cargo hauling utility vehicles, such as a John Deere Gator utility vehicle can also be used. Trucks and utility vehicles, however, have shortcomings when working with agricultural implements. They do not have the tractive ability of an agricultural tractor and are generally not equipped with a three point hitch. In small farm operations where it is not practical to buy several pieces of equipment, it is beneficial to have a utility transport tractor that combines the typical features of an agricultural tractor with the capability to carry cargo. Past attempts to combine tractors and trucks have focused on adding a three point hitch to a truck. These products suffer from poor performance in pulling an implement and often lack visibility typical of a tractor.

SUMMARY OF THE INVENTION

The utility transport tractor of the present invention has both the typical features of a conventional agricultural tractor and the capability to carry cargo. The tractor of the present invention modifies a tractor to include cargo carrying capability and is only slightly modified from a conventional tractor. The wheel base has been extended to move the rear axle rearward relative to the operator's station. The extension of the wheel base provides room above the rear axle to mount a cargo box. Since the operator's station is now forward of the rear wheels, there is enough lateral space on the operator's station for additional seats to carry passengers. The additional seats are to the side of the operator and are located forward and downward from the operator's seat. This allows the operator to see over the top of the passengers and moves the shoulders of the passengers forward of the operator's shoulders to increase occupant comfort.

The cargo box has an upright front wall, left and right side walls and a tail gate to easily contain loose materials such as soil, gravel or sand. The tail gate is hinged to the side walls in a manner that enables the tail gate to pivot from an upright closed position to four different open positions by rotating the tail gate about four separate axes. The tail gate can rotate about a lower horizontal axis at the bottom of the tail gate, about an upper horizontal axis at the top of the tail gate and about left and right upright axes at the left and right sides of the tail gate respectively.

The tail gate is rotatable about the upper horizontal axis to a upwardly and forwardly inclined position. Likewise, a rear portion of the cargo box floor is also rotatable to a forwardly and upwardly inclined position. In these inclined positions, the tail gate and the rear portion of the floor are inclined generally toward the eyes of an operator. In these raised positions, the operator is able to see the three point hitch and the implement attached thereto.

The cargo box has a metal frame structure attached to the tractor chassis. The side walls, front wall and tail gate are preferably formed of plastic panels while the floor and wheel well portion of the cargo box are formed of sheet metal. The use of plastic components reduces the weight of the cargo box and the manufacturing cost. The plastic is also dent resistant and does not need to be painted. The tail gate is mounted to the side walls by four identical hinges at the four corners of the tail gate to reduce the number of separate components used to attach the tail gate.

The utility transport tractor of the present invention retains the typical agricultural tractor configuration of large rear drive wheels for improved traction. The tractor further retains a three point hitch and assures visibility of the hitch by configuring the cargo box with one or more movable panels to enable an operator seated on the operator's station to view the three point hitch and implement.

DESCRIPTION OF THE PREFERRED EMBODIMENT

Figure 1:
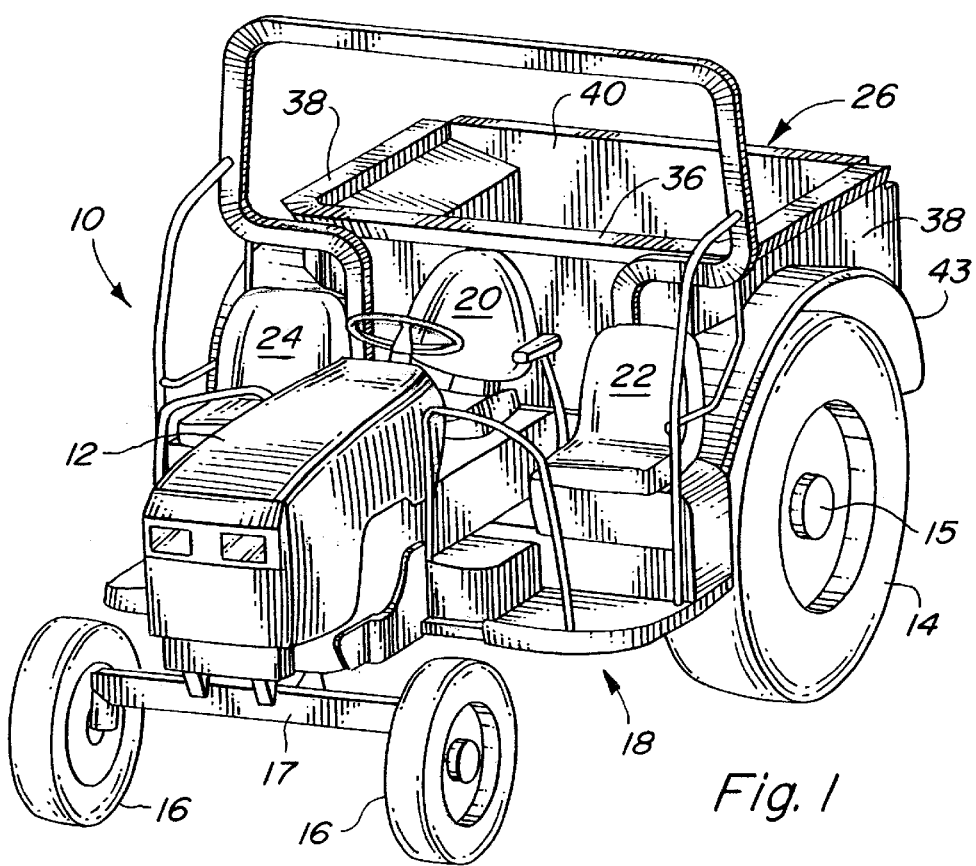
FIG. 1 is a perspective view of the utility transport tractor of the present invention.
Figure 2:
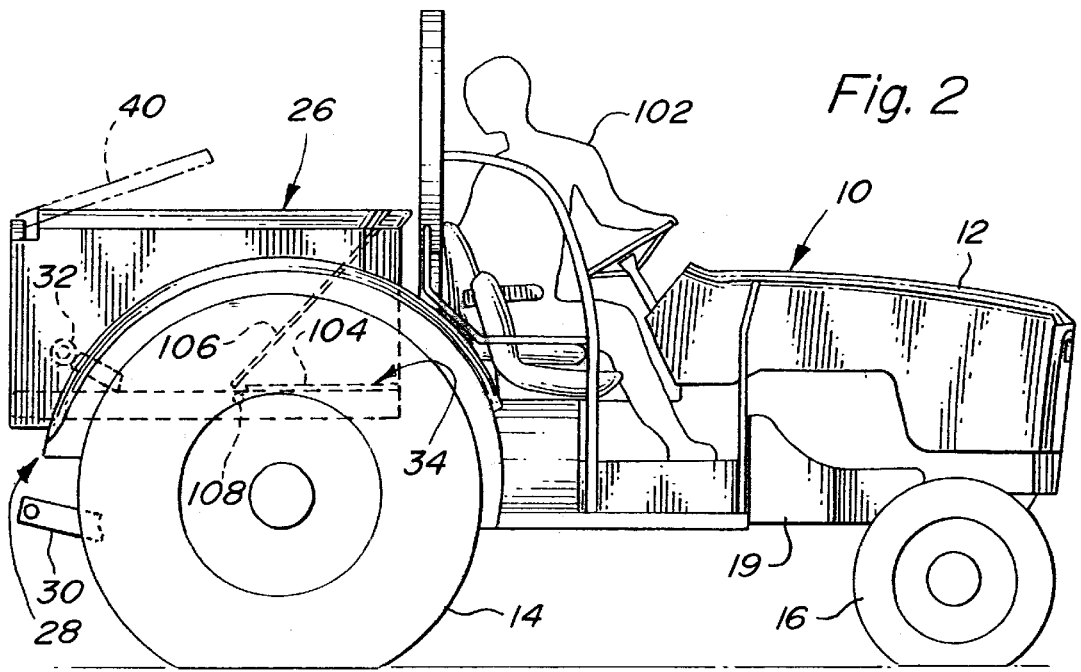
FIG. 2 is a side view of the utility transport tractor of the present invention.

With reference to FIG. 1, the utility transport tractor of the present invention is shown and designated generally as 10. The tractor 10 has a front hood 12 covering an engine, rear drive wheels 14 on a rear axle 15 and front wheels 16 on a front axle 17, all part of a tractor chassis 19. The front wheels 16 can be driven or non-driven. An operator's station 18 is located forward of the rear wheels and includes a center operator's seat 20 and left and right passenger seats 22, 24. A cargo box 26 is located rearward of the operator's station 18 and generally above the rear axle and rear wheels 14. A three point hitch 28 (FIG. 2) is mounted behind the rear axle and beneath the cargo box 26. The three point hitch includes a pair of lower draft links 30 and an upper link 32.

Figure 3:
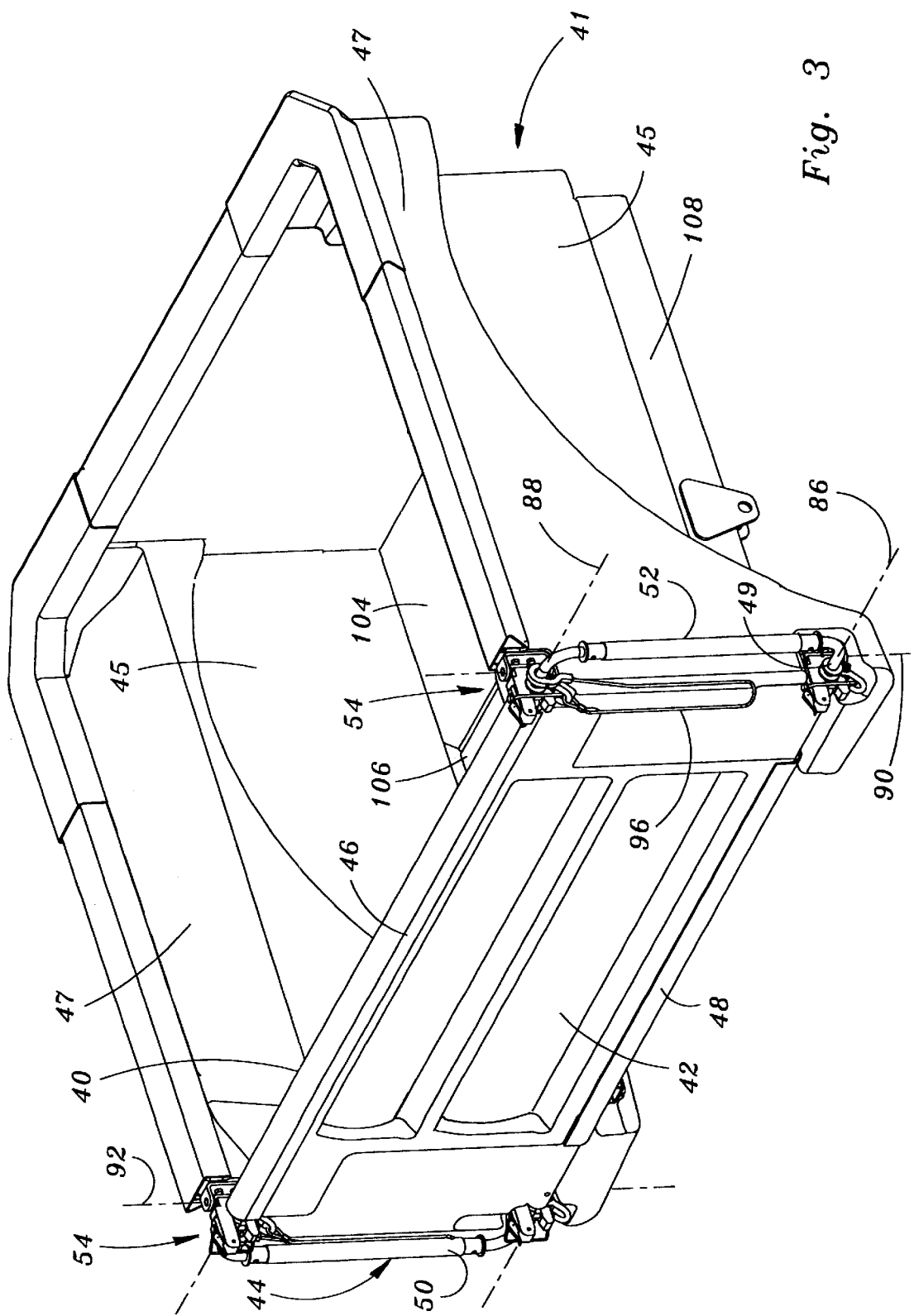
FIG. 3 is perspective view of the cargo box of the utility transport tractor of the present invention.

The cargo box 26 has a generally horizontal floor 34 (FIG. 2), an upright front wall 36, left and right side walls 38 and a tail gate 40 (FIG. 1). The cargo box side walls form fender wells 41 (FIG. 3) for the rear wheels with a portion of the cargo box being disposed above the rear wheels. Fenders 43 are attached to the tractor chassis and are shaped to fit within the wheel wells 41. The cargo box has a pair of side frame rails 108 made of metal. The floor 34 and the bottom portions 45 of the side walls are also metal. The upper portions 47 of the side walls, the front wall and the tail gate are molded of plastic. The plastic panels resist dents and are molded with color to avoid the need to be painted.

Figure 4:
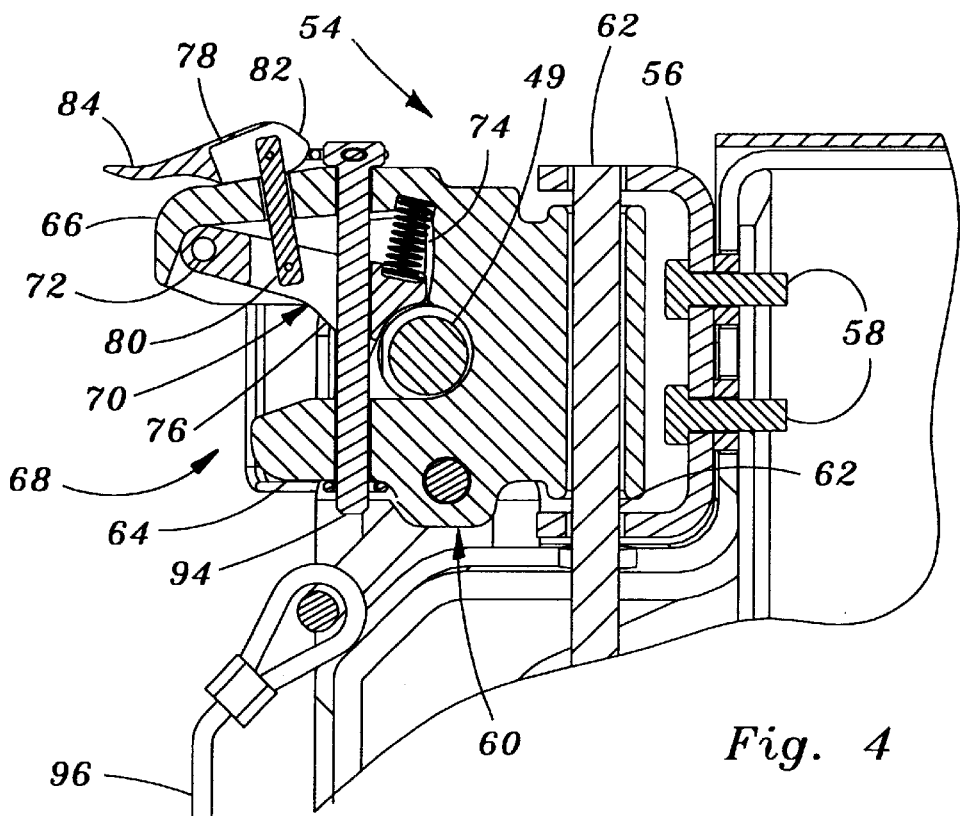
FIG. 4 is a fragmentary sectional view of the tail gate hinge latch mechanism on the tail gate of the cargo box shown in FIG. 3.

The tail gate 40 consists of a panel 42 mounted to a bar member 44 shaped as a rectangular frame. At both the top and bottom of the tail gate, the bar member 44 has horizontal projections 49 that extend laterally outward beyond the sides of the panel 42 and then bend vertically to form left and right handles 50, 52. The horizontal projections are captured in hinged latch mechanisms 54 at the four corners of the tail gate. The four hinged latch mechanisms 54 are all identical to one another and are shown in greater detail with reference to FIG. 4. Each latch mechanism includes a yoke 56 fastened to the respective side wall of the cargo box by a pair of bolts 58. A latch receiver 60 is mounted in the yoke 56 for rotation by a vertical pivot pin 62, enabling the latch receiver to pivot about the upright axis of the pin 62. The latch receiver 60 is generally U-shaped, having a lower leg 64 and an upper leg 66 forming an open slot 68 therebetween. The slot 68 receives the horizontal projection 49 of the bar member 44 at corner of the tail gate.

A catch 70 is pivotally mounted to the upper leg 66 by a pivot 72 and is biased downward into the slot 68 by a spring 74. The catch 70 has an inclined surface 76 that enables the catch 70 to be pushed upward into the upper leg 66, compressing the spring 74, in response to the bar member 44 being pushed into the slot 68. Once the bar member clears the catch 70, the spring 74 will urge the catch back into the slot 68, trapping the bar member therein. A lift lever 78 is connected to the catch 70 by a link 80. The lift lever has a cam surface 82 by which the lift lever will raise the catch 70 when the rear end 84 of the lift lever is manually raised to free the bar member to open the tail gate.

The tail gate can be opened by pivoting the tail gate downward about a lower horizontal axis 86 (FIG. 3) defined by the portion of the bar member 44 extending horizontally through the bottom portion 48 of the tail gate. This is accomplished by releasing the bar member at the two upper latch mechanisms 54 and rotating the tail gate about the axis 86. Likewise, the tail gate can be pivoted upward by rotation about the upper axis 88 defined by the bar member 44 extending horizontally through the top portion 46 of the tail gate.

The tail gate can also be pivoted to the left or to the right like a door. The tail gate is pivoted to the right by first releasing the two left side latch mechanisms. This allows the tail gate, together with the latch receivers 60 on the right side, to pivot about the upright axis 90 defined by the pivot pins 62 of the two right side latch mechanisms 54. The tail gate pivots to the left by rotation about the axis 92 defined by the pivot pins 62 of the two left side latch mechanisms 54. All four hinge latch mechanisms 54 are identical, reducing the number of different components in the cargo box. Secondary latch pins 94 (FIG. 4) can be installed in each of the latch mechanisms behind the bar member 44 to lock the bar member 44 in the latch mechanism. The latch pins 94 prevent inadvertent release of the bar member 44.

A cable 96 is attached at one end to each upper latch mechanism 54. A hook 98 is fastened to the other end of each cable and receives the upper portion of the bar member 44. The cable acts as a stop to hold the tail gate in a generally horizontal open position when the tail gate is lowered about the axis 86. The hook 98 is removable from the bar member 44 to enable the tail gate to be opened to either the left or the right sides.

Figure 5:
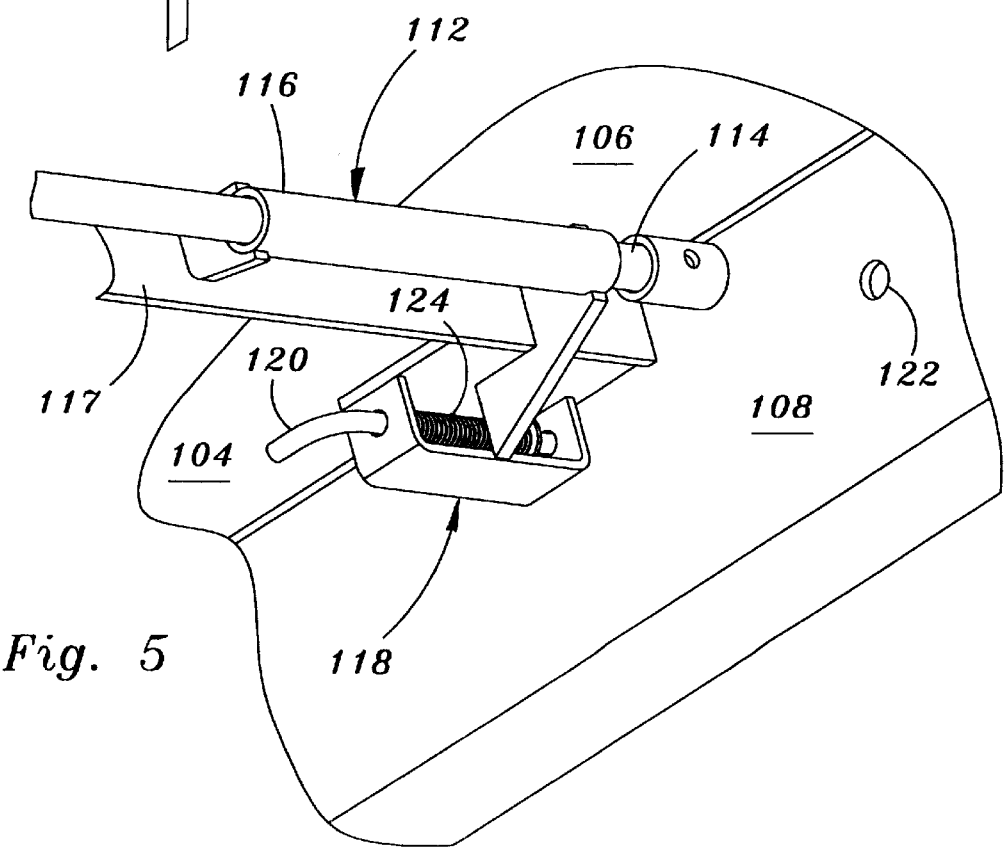
FIG. 5 is an upward perspective view of the bottom of the cargo box floor illustrating the hinge and latch for the pivoting rear portion of the floor.

The cargo box floor 34 has a front portion 104 that is fixed in position. A rear portion 106 of the floor is pivotally mounted to cargo box frame rails 108. The rear portion 106 is rotatably mounted by the hinge mechanism 112 (FIG. 5) to rotate to a forwardly and upwardly inclined position shown in FIG. 2. Likewise, the tail gate 40 can also raised to a forwardly and upwardly inclined position. In the forwardly and upwardly inclined positions, the floor rear portion 106 and tail gate 40 generally extend toward the eyes of a vehicle operator 102 seated in the center seat 20. In these raised positions of the tailgate and floor rear portion, the visibility of the three point hitch 28, which is generally beneath the rear portion 106 of the floor, is improved. This enables the operator to see the hitch when backing the tractor to an implement and also to monitor the implement when performing a field operation. In addition, the upper link 32 of the hitch can be raised above the cargo box floor. By raising the floor rear portion 106, a full range of motion can be provided with the hitch without moving the hitch rearward relative to the rear axle.

The floor rear portion 106 pivots about the a hinge pin 114 that is mounted to the cargo box frame rails 108 and extend laterally across the cargo box. Spaced tubes 116 are fixed to the down turned flange 117 at the front edge of the floor rear portion 106. The hinge pin 114 extends through the tubes 116. The floor rear portion 106 carries a latch mechanism 118 on -the bottom side of the floor 34. The latch mechanism includes a spring biased pin 120 that is urged against the surface of the rail 108 by a spring 124. When the floor rear portion 106 is raised to the hitch viewing position, the floor rear portion is held in place by the pin 120 seated into an aperture 122 in the side rail 108. When it is desired to lower the panel 106, the pin 120 is retracted from the aperture 122 and the floor rear portion 106 rotates away from the hitch viewing position. The pivoting floor rear portion 106 and the upward pivoting tail gate maintain visibility of the hitch common to conventional agricultural tractors.

The utility transport tractor of the present invention includes the features and function of a typical agricultural tractor and adds to it the ability to carry cargo. The hitch is retained generally in the same location relative to the rear axle and visibility of the hitch is maintained even though a cargo box is added above the rear axle. The cargo box has many convenient features particularly related to the tail gate hinges.

The invention should not be limited to the above-described embodiment, but should be limited solely by the claims that follow.

We claim:

1. A utility transport tractor comprising:
   a chassis including front and rear axles, the rear axle being a drive axle having a pair of drive wheels attached thereto;
   an operator's station having a seat for an operator;
   a three point hitch with links extending rearward beyond the rear axle; and
   a cargo box supported by the chassis generally above the rear axle, the cargo box having a floor, a front wall, side walls and a tail gate, the tail gate and a portion of the floor panel being movable between cargo use positions for carrying cargo in the cargo box and hitch use positions to facilitate viewing of the hitch by an operator seated on the seat.

2. The utility transport tractor as defined by claim 1 wherein the floor portion is movable between a substantially horizontal cargo use position and a forwardly and upwardly inclined hitch use position.

3. The utility transport tractor as defined by claim 2 wherein the three point hitch is below the floor in the cargo use position and the hitch has at least one link that can be raised to a position higher than the floor portion when the floor portion is in the cargo use position.

4. The utility transport tractor as defined by claim 1 wherein the tail gate is generally upright in the cargo use position and is forwardly and upwardly inclined in the hitch use position.

5. The utility transport tractor as defined by claim 1 wherein the cargo box includes fender wells over the rear wheels; and
further comprising rear fenders attached to the chassis for covering the rear drive wheels when the cargo box is removed.

6. The utility transport tractor as defined by claim 1 wherein the cargo box has a metal frame with a plurality of metal and plastic panels attached thereto to form the cargo box.

7. A cargo box for a utility vehicle comprising:
a generally horizontal floor;
an upright front wall;
upright side walls;
a tail gate comprising a single panel mounted to the side walls having an upright closed position forming a rear wall of the cargo box, the single panel being mounted to the side walls for selective pivotal movement about one of four separate axes to move the single panel to one of four different open positions.

8. The cargo box as defined by claim 7 wherein the four axes include upper and lower horizontal axes generally at the upper and lower ends of the tail gate and left and right upright axes generally at left and right sides of the tail gate.

9. The cargo box as defined by claim 7 wherein the tail gate is attached to the side walls by four identical hinge assemblies with one hinge assembly at each corner of the tail gate.

10. The cargo box as defined by claim 9 wherein two hinge assemblies define a left upright axis while the other two hinge assemblies define a right upright axis.

11. The cargo box as defined by claim 9 wherein two hinge assemblies together with the tail gate define an upper horizontal axis and the other two hinge assemblies together with the tail gate define a lower horizontal axis.

12. The cargo box as defined by claim 9 wherein each hinge assembly includes a U-shaped mounting yoke attached to the side wall and a receiver pinned to the mounting yoke for rotation about an axis of a pin and wherein the receiver includes an open slot to receive a portion of the tail gate therein and a latch means to retain the tail gate portion therein.

13. The cargo box as defined by claim 12 wherein the portion of the tail gate received by the open slot in the hinge assembly receiver defines an axis of rotation for the tail gate.

14. The cargo box as defined by claim 7 wherein the floor has a portion that rotates to an upward and forwardly inclined position.

15. The cargo box as defined by claim 14 wherein the portion of the floor is pivotally mounted to the side walls of the cargo box.

16. A utility transport tractor comprising:
a chassis including front and rear axles, the rear axle having a pair of wheels mounted thereto;
an operator's station having a seat for an operator; and
a cargo box supported by the chassis generally above the rear axle, the cargo box having a generally horizontal floor, a front wall, a pair of side walls and a tail gate mounted to the side walls having an upright closed position forming a rear wall of the cargo box, the tail gate being mounted to the side walls for selective pivotal movement about four separate axis to move to one of four different open positions.

17. The cargo box as defined by claim 16 wherein the four axes include upper and lower lateral axes generally at the top and bottom of the tail gate respectively and left and right upright axes generally at left and right sides of the tail gate respectively.

18. The cargo box as defined by claim 16 wherein the tail gate is attached to the side walls by four identical hinge assemblies.

19. The cargo box as defined by claim 18 wherein two hinge assemblies define a left upright axis for pivotal movement of the tail gate while the other two hinge assemblies define a right upright axis for pivotal movement of the tail gate.

20. The cargo box as defined by claim 18 wherein two hinge assemblies define an upper horizontal axis for pivotal movement of the tail gate and the other two hinge assemblies define a lower horizontal axis for pivotal movement of the tail gate.

21. A utility transport tractor comprising:
a chassis including front and rear axles, the rear axle having a pair of wheel and tire assemblies;
an operator's station having a seat for an operator;
a three point hitch carried with links extending rearward of the rear axle;
a cargo box supported by the chassis generally above the rear axle, the cargo box having a generally horizontal floor, an upright front wall, upright side walls, and a tail gate mounted to the side walls having an upright closed position forming a rear wall of the cargo box, the tail gate being mounted to the side wall for selective pivotal movement about multiple axes including movement to a hitch use position in which the tail gate extends upwardly and forwardly to facilitate viewing of the hitch by an operator seated on the seat.

22. The utility transport tractor as defined by claim 21 wherein the floor of the cargo box has a rear portion that is movable from a generally horizontal cargo use position to a hitch use position in which the floor rear portion is upwardly and forwardly inclined to facilitate viewing of the hitch by an operator seated on the seat.

* * * * *